US012803767B2

(12) United States Patent
Xie et al.

(10) Patent No.: US 12,803,767 B2
(45) Date of Patent: Nov. 17, 2026

(54) CARRIER ACTIVATION/DEACTIVATION AND CARRIER FREQUENCY ACTIVATION/DEACTIVATION

(71) Applicant: ZTE Corporation, Shenzhen (CN)

(72) Inventors: Feng Xie, Shenzhen (CN); Hanchao Liu, Shenzhen (CN); Yan Xue, Shenzhen (CN); Fei Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 311 days.

(21) Appl. No.: 18/602,507

(22) Filed: Mar. 12, 2024

(65) Prior Publication Data

US 2024/0305437 A1 Sep. 12, 2024

Related U.S. Application Data

(63) Continuation of application No. PCT/CN2021/133359, filed on Nov. 26, 2021.

(51) Int. Cl.
*H04L 5/00* (2006.01)

(52) U.S. Cl.
CPC .......... *H04L 5/0098* (2013.01); *H04L 5/0092* (2013.01); *H04L 5/0094* (2013.01)

(58) Field of Classification Search
CPC ............................ H04L 5/0092; H04L 5/0094
USPC ......................... 370/329, 401, 402, 403, 405
See application file for complete search history.

(56) References Cited

U.S. PATENT DOCUMENTS

| | | | | |
|---|---|---|---|---|
| 2011/0026422 | A1 | 2/2011 | Ma et al. | |
| 2011/0116467 | A1 | 5/2011 | Jung et al. | |
| 2013/0272259 | A1 | 10/2013 | Kim et al. | |
| 2016/0157218 | A1* | 6/2016 | Nam | H04B 7/0639 370/329 |
| 2020/0280987 | A1 | 9/2020 | Liu et al. | |
| 2021/0274477 | A1* | 9/2021 | Yi | H04L 5/0053 |
| 2022/0346104 | A1* | 10/2022 | Yi | H04L 1/1854 |

FOREIGN PATENT DOCUMENTS

| | | |
|---|---|---|
| CN | 109428705 | 3/2019 |
| WO | 2011-082680 | 7/2011 |
| WO | 2013/143051 | 10/2013 |

OTHER PUBLICATIONS

Extended European Search Report for co-pending EP Application No. 21 965 169.2, Report dated Apr. 11, 2025, 9 pages.
International Search Report and Written Opinion for PCT/CN2021/133359, filed Nov. 26, 2021, Report dated Nov. 18, 2022, 9 pages.

* cited by examiner

*Primary Examiner* — Dang T Ton
(74) *Attorney, Agent, or Firm* — Ashurst Perkins Coie US LLP

(57) ABSTRACT

Systems, apparatus and methods of wireless communication are described. One example method includes receiving, by a wireless device, a configuration information from a network device, wherein the configuration information includes correspondences between carriers and carrier frequencies; receiving, after the configuration information is received, an indication for activation or deactivation of the correspondences between carriers and carrier frequencies; and performing the activation or deactivation according to the indication.

20 Claims, 13 Drawing Sheets

730

710

720

730

750

CARRIER ACTIVATION/DEACTIVATION AND CARRIER FREQUENCY ACTIVATION/DEACTIVATION

CROSS-REFERENCE TO RELATED APPLICATION

This application is a continuation and claims priority to International Application No. PCT/CN2021/133359, filed on Nov. 26, 2021, the disclosure of which is hereby incorporated by reference herein in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices.

SUMMARY

This document relates to methods, systems, and devices for transmitting configuration information in mobile communication technology.

In one exemplary aspect, a wireless communication method is disclosed. The method includes receiving, by a wireless device, a configuration information from a network device, wherein the configuration information includes correspondences between carriers and carrier frequencies; receiving, after the configuration information is received, an indication for activation or deactivation of the correspondences between carriers and carrier frequencies; and performing the activation or deactivation according to the indication.

In another exemplary aspect, another wireless communication method is disclosed. The method includes receiving, by a wireless device, a configuration information from a network device, wherein the configuration information includes carrier frequency configuration; receiving, after the configuration information is received, an indication for activation or deactivation of one or more carrier frequencies; and performing the activation or deactivation according to the indication.

In another exemplary aspect, another wireless communication method is disclosed. The method includes receiving, by a wireless device, a configuration information from a network device, wherein the configuration information includes carrier configuration; receiving, after the configuration information is received, an indication for activation or deactivation of one or more carriers; and performing the activation or deactivation according to the indication.

In another exemplary aspect, another wireless communication method is disclosed. The method includes transmitting, from a network device to a wireless device, a configuration information, wherein the configuration information includes correspondences between carriers and carrier frequencies; transmitting, after the configuration information is transmitted, an indication for activation or deactivation of the correspondences between carriers and carrier frequencies, thereby instructing the wireless device to cause the activation or deactivation according to the indication.

In another exemplary aspect, another wireless communication method is disclosed. The method includes transmitting, by a network device to a wireless device, a configuration information, wherein the configuration information includes carrier frequency configuration; transmitting, after the configuration information is transmitted, an indication for activation or deactivation of one or more carrier frequencies; thereby instructing the wireless device to cause the activation or deactivation according to the indication.

In another exemplary aspect, another wireless communication method is disclosed. The method includes transmitting, by a network device to a wireless device, a configuration information, wherein the configuration information includes carrier configuration; transmitting, after the configuration information is transmitted, an indication for activation or deactivation of one or more carriers, thereby causing the wireless device to perform the activation or deactivation according to the indication.

In yet another exemplary aspect, the above-described methods are embodied in the form of processor-executable code and stored in a computer-readable program medium.

In yet another exemplary embodiment, a device that is configured or operable to perform the above-described methods is disclosed. The device may include a processor configured to implement a described method.

The above and other aspects and their implementations are described in greater detail in the drawings, the descriptions, and the claims.

DETAILED DESCRIPTION

Figure 1A:
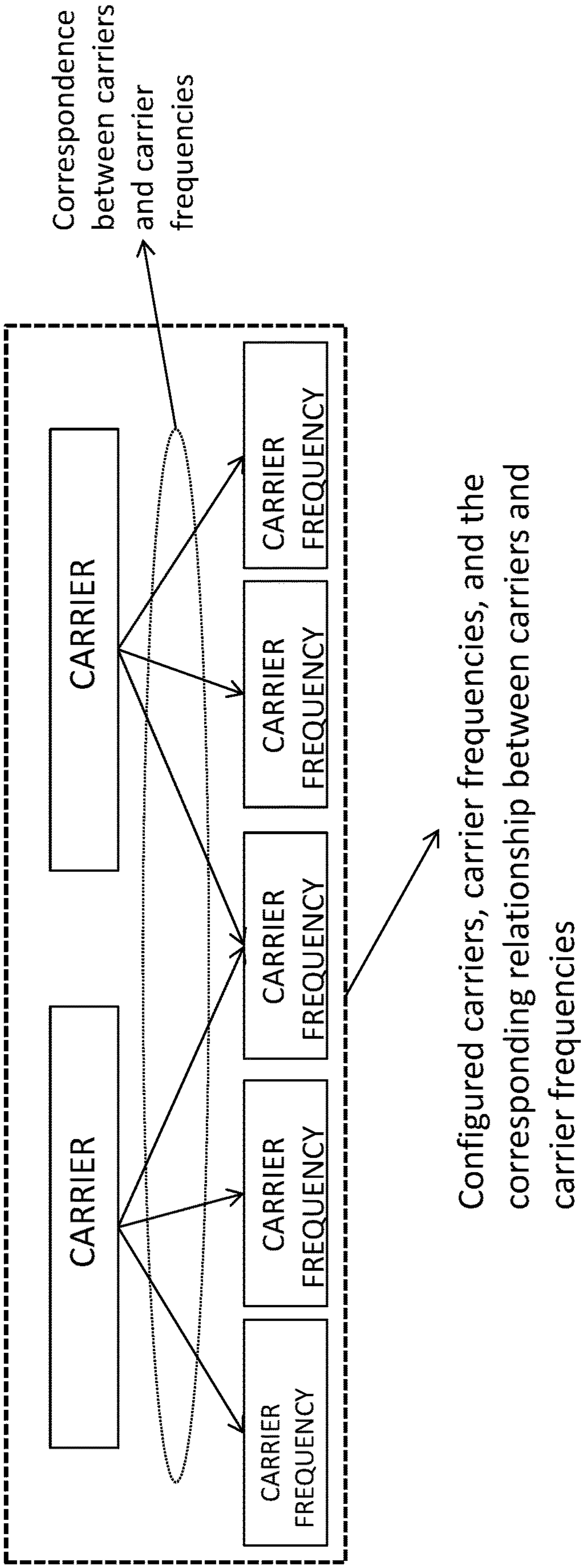
FIG. 1A shows an example of multiple configured carriers, multiple configured carrier frequencies, and the configured correspondence between multiple carriers and carrier frequencies.

Section headings are used in the present document only to improve readability and do not limit scope of the disclosed embodiments and techniques in each section to only that section.

Currently, there is a problem of severe fragmentation of spectrum resources in the world, especially at low frequency range (sub-6 GHz). As further disclosed in the present document, some of the disclosed techniques may be used by embodiments to improve the use efficiency of fragmented spectrum, including implementing a method in which one or more carriers correspond to multiple carrier frequencies.

In presently deployed wireless networks, user equipment (UE) is configured with multiple carrier frequencies and carriers. Regardless of whether UE uses these carriers and carrier frequencies for communication, it needs to monitor all the carrier frequencies and carriers. When the number of configured carrier frequencies and the number of carriers is large, the energy consumption of UE for this monitoring operation will be very high. The efficient use of fragmented spectrum requires UE to configure many carrier frequencies and carriers, and the impact of UE energy consumption may be difficult to tolerate. From the time of commercialization of 5G, UE energy consumption has become an important technical issue. With the acceleration of 5G commercialization and the emergence of new 6G services, new scenarios, and new applications, UE energy saving has become an urgent technical problem to be solved.

In some embodiments, when a UE is configured with multiple carriers and multiple carrier frequencies, UE will not use all the carrier frequencies and carriers but will only use the activated carrier for communication. UE will receive indication information indicating which of the configured carriers and carrier frequencies are activated. UE uses the activated carriers and carrier frequencies for communication. UE will receive indication information to indicate some carriers or the carrier frequencies are deactivated, and UE will not use these deactivated carriers or carrier frequencies for communication. Similarly, UE will only use the activated carrier and carrier frequency to monitor and communicate on the activated carrier and carrier frequency. For unnecessary carrier frequencies or carriers, UE will deactivate them. The energy consumption of UE will be reduced to a large extent, thereby prolonging the battery life of UE.

UE is configured with one or more carriers and one or more carrier frequencies, and one or more correspondences between carriers and carrier frequencies. If UE uses these carriers and carrier frequencies and correspondences for communication, the energy consumption of UE will be high, which is not conducive to the endurance of UE. The present invention provides a method for reducing UE energy consumption.

In some embodiments, UE is configured with multiple carriers and multiple carrier frequencies, and the correspondences between the carriers and the carrier frequencies. UE receives activation indication information, including indication information for activating the carrier; indication information for activating the carrier frequency; indication information of the correspondences between the activated carrier and the activated carrier frequency.

When a carrier is activated, all correspondences between the carrier and carrier frequencies are also activated. Further, it will also be determined whether the corresponding carrier frequencies in the correspondences associated with this carrier has been activated. If a carrier frequency has been activated, the correspondence between the carrier and the carrier frequency is activated. Otherwise, the correspondence between the carrier and the carrier frequency is not activated.

In some embodiments, when a carrier frequency is activated, all correspondences between carriers and the carrier frequency are also activated. Furthermore, it may be determined whether the corresponding carriers in the correspondence associated with the carrier frequency has been activated. If a carrier has been activated, the correspondence between the carrier and the carrier frequency is activated; otherwise, the correspondence between the carrier and the carrier frequency is not activated.

When a correspondence between one or more carriers and one or more carrier frequencies is activated, it is also necessary to determine whether the corresponding carriers and carrier frequencies in the correspondence have been activated. If the carriers and the carrier frequencies have been all activated, the correspondence between the carriers and the carrier frequencies is activated, otherwise the correspondence between the carriers and the carrier frequencies is not activated.

UE uses the activated carriers, the activated carrier frequencies, and the activated correspondences between the carriers and the carrier frequencies.

UE receives deactivation indication information, which includes indication information for deactivating the carrier, indication information to deactivate the carrier frequency, and indication information of the correspondence between carriers and carrier frequencies.

When a carrier is deactivated, all correspondences between the carrier and carrier frequencies is also deactivated.

When a carrier frequency is activated, all correspondences between carriers and the carrier frequency are also deactivated.

When a correspondence between one or more carriers and one or more carrier frequencies is deactivated, only the correspondence is deactivated.

UE uses the activated carriers, the activated carrier frequencies, and the activated correspondences between carriers and carrier frequencies.

In the prior art, UE is configured with multiple carriers, multiple carrier frequencies, and multiple correspondence between carriers and carrier frequencies. UE uses configured carriers, configured carrier frequencies, and configured correspondences between carriers and carrier frequencies, as shown in FIG. 1A.

In the present application, UE is configured with multiple carriers, multiple carrier frequencies, and multiple correspondences between carriers and carrier frequencies. But UE will not directly use these configured carriers, configured carrier frequencies, and configured correspondences between carriers and carrier frequencies, and will use activated carriers, activated carrier frequencies, and activated correspondences between carriers and carrier frequencies.

When UE receives the indication information to activate carriers, carrier frequencies, and correspondences between carriers and carrier frequencies, and UE activates the corresponding carriers, carrier frequencies, or correspondences between carriers and carrier frequencies. UE will further use the activated carriers, the activated carrier frequencies, and the activated correspondences between carriers and carrier frequencies.

Figure 1B:
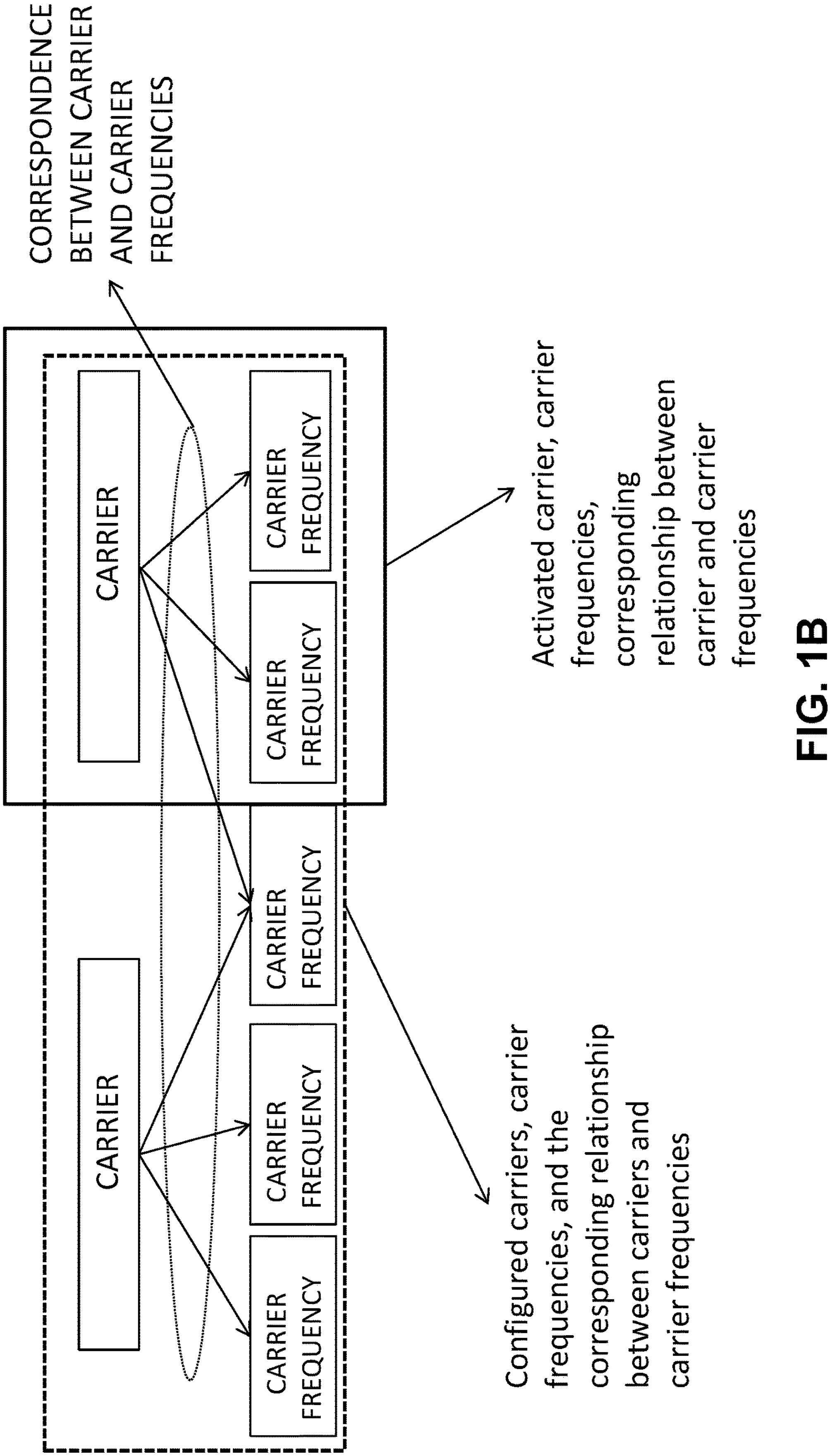
FIG. 1B shows an example of UE using the activated carrier, activated carrier frequencies, and the activated correspondence between the activated carrier and the activated carrier frequencies.

When UE receives the indication information of deactivating carriers, deactivating carrier frequencies, or deactivating correspondences between carriers and carrier frequencies, UE deactivates the corresponding carriers, the carrier frequencies, or the correspondences between carriers and carrier frequencies. But UE will still use the carriers, the carrier frequencies, and correspondences between carriers and carrier frequencies, which are still in active states, as shown in FIG. 1B.

Embodiment 1

In order to better manage the energy consumption of the terminal, correspondences between carriers and carrier frequencies may be activated or deactivated, and UE uses the activated correspondences between carriers and carrier frequencies to control the energy consumption.

Figure 2:
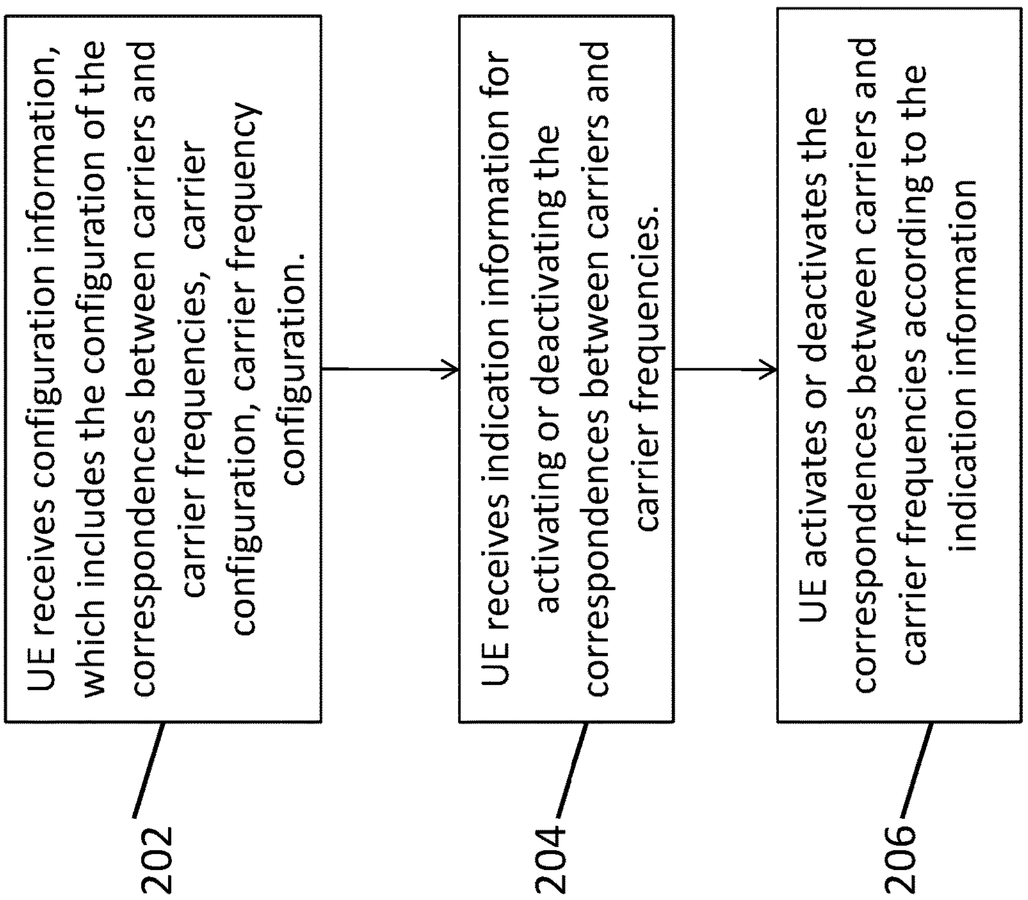
FIG. 2 shows an example of a flowchart of a UE-side processing method.

FIG. 2 is a flowchart of UE side processing method of the present application in this embodiment with steps including: Step 1 (202):

UE receives configuration information. The configuration information includes: the configurations of correspondences between carriers and carrier frequencies, carrier configurations, and carrier frequency configurations.

UE receives the carrier configuration, carrier frequency configuration, and the configurations of correspondences between carriers and carrier frequencies, but does not use all of correspondences between carriers and carrier frequencies. UE will only use the activated correspondences, the activated carriers and the activated carrier frequencies.

Indexes of the correspondences between carriers and carrier frequencies included in the configuration of correspondences, carrier indexes included in the configuration information, and carrier frequency indexes included in the configuration information are used for the activation or deactivation processes.

Carrier configurations, carrier frequency configurations, or configurations of correspondences between carriers and carrier frequencies are configured through an radio resource control (RRC) message. The RRC message includes RRCsetup, RRCReconfiguration, ReconfigurationWithSync, or system messages. The system message may include SIB1 system information block.

Furthermore, system message received by UE in the IDLE state or the INACTIVE state includes the configuration. RRCsetup and/or RRCReconfiguration received by UE in the connected state include the configuration. During the handover process, the ReconfigurationWithSync received by UE includes the configuration.

The configuration is modified through high-layer signaling. The high-layer signaling includes RRCReconfiguration. dences according to correspondences indicated in the activation indication information. For correspondences not used in a given time, UE may deactivates the correspondences according to correspondences indicated in the deactivation indication information, and remain some correspondences to be activated for being used.

When receiving an indication information for activating correspondences between carriers and carrier frequencies, UE needs to determine whether the carriers and carrier frequencies associated with the correspondences have been activated. Only when the carriers and the carrier frequencies have been all activated, the correspondences can be activated. Otherwise UE will not perform the subsequent activation process of the correspondences between the carriers and the carrier frequencies.

The indication information used to activate/deactivate the correspondences between the carriers and the carrier frequencies includes: L3 indication information, L2 indication information, and L1 indication information. L3 indication information includes RRC message and RRC IE. L2 indication information includes media access control (MAC) control element (MACCE). L1 indication information includes downlink control channel DCI. RRC messages include: RRCsetup, RRCReconfiguration, ReconfigurationWithSync, or system messages. The system messages include: SIB1.

The methods of RRC IE indicating correspondences between carriers and carrier frequencies includes:

Method 1

The radio resource control information element (RRC IE) indicates the correspondences between carriers and carrier frequencies to be activated or deactivated, including: a list of indexes of the activated correspondence between carriers and carrier frequencies; a list of indexes of the deactivated correspondence between carriers and carrier frequencies.

Furthermore,

```
The activation configuration of correspondences between carriers and carrier frequencies:: =
SEQUENCE {
List of indexes of activated correspondences between carriers and carrier frequencies:
SEQUENCE (SIZE (1..max number of correspondence between carriers and carrier
frequencies)) OF index of correspondence between carriers and carrier frequencies;
List of indexes of deactivated correspondences between carriers and carrier frequencies:
SEQUENCE (SIZE (1..max number of correspondence between carriers and carrier
frequencies)) OF indexes of correspondence between carriers and carrier frequencies;
}
```

Step 2 (204):

UE receives indication information for activating or deactivating correspondences between carriers and carrier frequencies.

The indication information used to activate correspondences indicates correspondences between one or more carriers and one or more carrier frequencies to be activated. The indication information used to deactivate correspondences indicates correspondences between one or more carriers and one or more carrier frequencies to be deactivated.

UE is configured with multiple correspondences between carriers and carrier frequencies, but not all of the correspondences are used by UE. UE may only use a part of the correspondences in a given time. The correspondences used may be the subset of the correspondences configured, therefore a subset of the correspondences configured may be activated to be used by UE. UE activates the correspon- The indexes of activated list correspond the activated correspondences between carriers and carrier frequencies.

The indexes of deactivated list correspond the deactivated correspondences between carriers and carrier frequencies.

Method 2

The radio resource control information element (RRC IE) indicates an activated correspondence between carrier and carrier frequencies, including: a carrier index; a list of carrier frequency indexes, indicating that correspondence between this carrier and these carrier frequencies is activated.

The radio resource control information element (RRC IE) indicates a deactivated correspondence between carrier and carrier frequencies, including:

- a carrier index and a list of carrier frequency indexes, indicating that the correspondence between this carrier and these carrier frequencies is deactivated.

Furthermore,

```
The configuration of activation of a correspondence between the carrier and the carrier
frequencies:: = SEQUENCE {
Carrier index    INTEGER (1..max number of carrier index)
List of carrier frequency indexes    SEQUENCE (SIZE (1..max number of carrier frequency
index)) OF carrier frequency index;
}
```

The RRC IE indicates that the activated correspondence established between a carrier and multiple carrier frequencies by the carrier index and the list of carrier frequency indexes.

Indication information used to deactivate correspondences between carriers and carrier frequencies includes: an RRC message, and the RRC message includes RRCReconfiguration or ReconfigurationWithSync.

```
The configuration of deactivation of the correspondence between carrier and carrier frequencies::
= SEQUENCE {
Carrier index    INTEGER (1..max number of carrier index)
List of carrier frequency indexes    SEQUENCE (SIZE (1..max number of carrier frequency
index)) OF carrier frequency index;
}
```

The RRC IE indicates that the deactivated correspondence established between a carrier and multiple carrier frequencies by the carrier index and the list of carrier frequency indexes.

Method 3

The radio resource control information element (RRC IE) indicates the activated or deactivated correspondence between carriers and carrier frequencies, including: an add list of indexes of activated correspondences between carriers and carrier frequencies; a delete list of indexes of activated correspondences between carriers and carrier frequencies.

Furthermore,

Further, RRCsetup and/or RRCReconfiguration received by UE in the connected state include the indication information.

During the handover process, ReconfigurationWithSync received by UE includes the indication information.

The indication information is modified by high-layer signaling, and the high-layer signaling includes: RRCReconfiguration.

MACCE used to activate and deactivate correspondences between carriers and carrier frequencies corresponds to a logical channel identifier LCID, which indicates whether the MACCE is used to activate or deactivate the correspondence between carriers and carrier frequencies.

```
The activation or deactivation configuration of correspondences between carriers and carrier
frequencies:: = SEQUENCE {
Add list (ToAddModList) of activated correspondence between carriers and carrier frequencies
SEQUENCE (SIZE (1..max number of correspondence between carriers and carrier
frequencies)) OF index of activated correspondence between carriers and carrier frequencies;
Delete list(ToReleaseList) of activated correspondence between carriers and carrier frequencies
SEQUENCE (SIZE (1..max number of correspondence between carriers and carrier
frequencies)) OF index of activated correspondence between carriers and carrier frequencies;
}
```

Activated correspondences between carriers and carrier frequencies correspond to indexes of correspondences in the added list.

Deactivated correspondences between carriers and carrier frequencies correspond to indexes of correspondences in the deletion list.

Indication information used to activate correspondences between carriers and carrier frequencies includes an RRC message. The RRC message includes RRCsetup, RRCReconfiguration, ReconfigurationWithSync, or a system message. The system message includes SIB1.

Further, system message received by UE in the IDLE state or the INACTIVE state includes the indication information. RRCsetup and/or RRCReconfiguration received by UE in the connected state includes the indication information. During the handover process, the ReconfigurationWithSync received by UE includes the indication information.

The indication information is modified by high-layer signaling, and the high-layer signaling includes RRCReconfiguration.

The ways for MACCE to activate or deactivate correspondences between carriers and carrier frequencies include:

Method 1

MACCE contains N fields of the same type, and each field corresponds to a correspondence between one or more carriers and one or more carrier frequencies, and value of this field indicates activation/deactivation state of correspondence between carriers and carrier frequencies. field number is determined according to index of correspondence between carriers and carrier frequencies, the first field corresponds to the smallest index, the second field corresponds to the second smallest index, and so on. Where N corresponds to the number of correspondences between carriers and carrier frequencies that need to be activated or deactivated at most, and N is configurable. N may be equal to the number of configured correspondences between carriers and carrier frequencies.

For example, a field value of 1 indicates that the correspondence between carriers and carrier frequencies is activated; a field value of 0 indicates that the correspondence between carriers and carrier frequencies is deactivated.

Method 2

MACCE contains: a first type field, indicating a carrier index; N second type fields, each field corresponds to a carrier frequency and the value of this field indicates the activation/deactivation status of carrier frequency. The field number is determined according to the carrier frequency index, the first field corresponds to the smallest index, the second field corresponds to the second smallest index, and so on. Where N corresponds to the maximum number of correspondences between carriers and carrier frequencies that need to be activated or deactivated. N is configurable. N can equal the number of configured correspondences between carriers and carrier frequencies.

The first type field and the second type fields jointly indicate whether the carrier frequency corresponding to a carrier is activated or deactivated, which is equivalent to whether the correspondences between the carrier and the carrier frequencies is activated or deactivated. Wherein, the first type field indicates the carrier, and the second fields indicates the carrier frequencies.

For example, the value of the second type field is 1, which indicates that the corresponding carrier frequency is activated, and further indicates that the correspondence between the carrier indicated by the first type field and the carrier frequency is activated. The value of the second type field is 0, which indicates that the corresponding carrier frequency is deactivated, which further indicates that the correspondence between the carrier indicated by the first type field and the carrier frequency is deactivated.

Method 3

MACCE contains: a first type field, indicating whether the MACCE is used for activation or deactivation; N second type fields, each field corresponds to a correspondence between carriers and carrier frequencies, and the value of this field indicates whether the correspondence is activated or deactivated. The field number is determined according to the index of correspondence between carriers and carrier frequencies, the first field corresponds to the smallest index, the second field corresponds to the second smallest index, and so on. Where N corresponds to the number of correspondences between carriers and carrier frequencies that need to be activated or deactivated at most. N is configurable. N may equal the number of configured correspondences between carriers and carrier frequencies.

For example, when the first type field indicates that the MACCE is used for activation, the value of the second type field is 1 indicating that the correspondence between carriers and carrier frequencies is activated, and the value of the second type field is 0 indicating that the correspondence between carriers and carrier frequencies is not activated; when the first type field indicates that the MACCE is used for deactivation, the value of the second type field is 1 indicating that the correspondence between carriers and carrier frequencies is deactivated, and the value of the second type field is 0 indicating that the correspondence between carriers and carrier frequencies is not deactivated.

Method 4

MACCE contains: a first type field, indicating whether the MACCE is used for activation or deactivation; a second type field, indicating a carrier index; N third type fields, with each field corresponding to a carrier frequency and the value of this field indicating whether the correspondence between carriers and carrier frequencies is activated or deactivated. The field number is determined according to the carrier frequency index corresponding to a carrier, the first field corresponds to the smallest index, the second field corresponds to the second smallest index, and so on. Where N corresponds to the maximum number of correspondences between carriers and carrier frequencies that need to be activated or deactivated. N is configurable. N can equal the number of configured correspondences between carriers and carrier frequencies.

The second type field and the third type field jointly indicate whether the one or more carrier frequencies corresponding to a carrier are activated or deactivated, which is equivalent to whether the correspondence between a carrier and carrier frequencies is activated or deactivated. Wherein, the second type field indicates the carrier, and the third type field indicates the carrier frequency.

For example, when the first type field indicates that the MACCE is used for activation, value of 1 in the third type field indicates that the corresponding carrier frequency is activated, and further indicates that the correspondence between the carrier indicated by the second type field and the carrier frequency indicated by the third type field is activated; the value of the third type field is 0, which means that the corresponding carrier frequency is not activated, and it further indicates that the correspondence between the carrier indicated by the second type field and the carrier frequency is not activated. when the first type field indicates this MACCE is used for deactivation, the value of the second type field is 1 indicating that the corresponding carrier frequency is deactivated, and it further indicates that the correspondence between the carrier indicated by the second type field and the carrier frequency is deactivated, and the value of the third type field is 0 indicating that the corresponding carrier frequency is not deactivated, and it further indicates that the correspondence between the carrier indicated by the second type field and the carrier frequency is not deactivated.

The DCI indicating activated or deactivated correspondences between carriers and carrier frequencies includes:

Method 1

The DCI contains N bits. Each bit corresponds to the correspondence between carriers and carrier frequencies. The value of this bit indicates activation or deactivation of correspondence between carriers and the carrier frequencies. A value of 1 means activation of correspondence, and a value of 0 means deactivation of correspondence. The bit order is determined according to index of correspondence between carriers and carrier frequencies, the first field corresponds to the smallest index, the second field corresponds to the second smallest index, and so on. Where N corresponds to the number of correspondences between carriers and carrier frequencies that need to be activated or deactivated at most. N is configurable. N may equal the number of configured correspondences between carriers and carrier frequencies.

Method 2

DCI includes round up (log 2(M)) first type bits indicating a carrier index, where M is the number of configured carriers; N second type bits, each bit corresponding to a carrier frequency. The values of the above two types of bits indicate that the correspondence established between the indicated carrier and the indicated carrier frequencies is activated or deactivated, and a value of 1 means activation of correspondence, and a value of 0 means deactivation of correspondence. The bit order is determined according to the carrier frequency index corresponding to a carrier, the first field corresponds to the smallest index, the second field corresponds to the second smallest index, and so on. Where N corresponds to the number of correspondences between carriers and carrier frequencies that need to be activated or deactivated at most. N is configurable. N may equal the number of configured correspondences between carriers and carrier frequencies.

Step 3 (206):

UE activates or deactivates correspondences between carriers and carrier frequencies according to received indication information.

UE determines correspondences to be activated or deactivated through the indication information. UE uses activated correspondences between carriers and carrier frequencies.

When indicated to activate a correspondence between carriers and carrier frequencies, UE needs to determine whether the carriers and the carrier frequencies associated with the correspondence have been activated. Only when the carriers and the carrier frequencies have been activated, the correspondence between the carriers and the carrier frequencies can be activated. Otherwise UE will not activate the correspondence between the carriers and the carrier frequencies.

Before acquiring new indication information, UE always executes the content of the latest indication information.

When the carrier configuration, or carrier frequency configuration, or the configuration of the correspondence between the carriers and the carrier frequencies is reconfigured, UE releases the correspondences between the carriers and the carrier frequencies.

Embodiment 2 (Carrier Frequency Activation or Deactivation)

To better manage the energy consumption of terminal, the carrier frequency can be activated or deactivated, and UE uses the carrier frequency in the active state, so that the energy consumption of UE can be well controlled.

Figure 3:
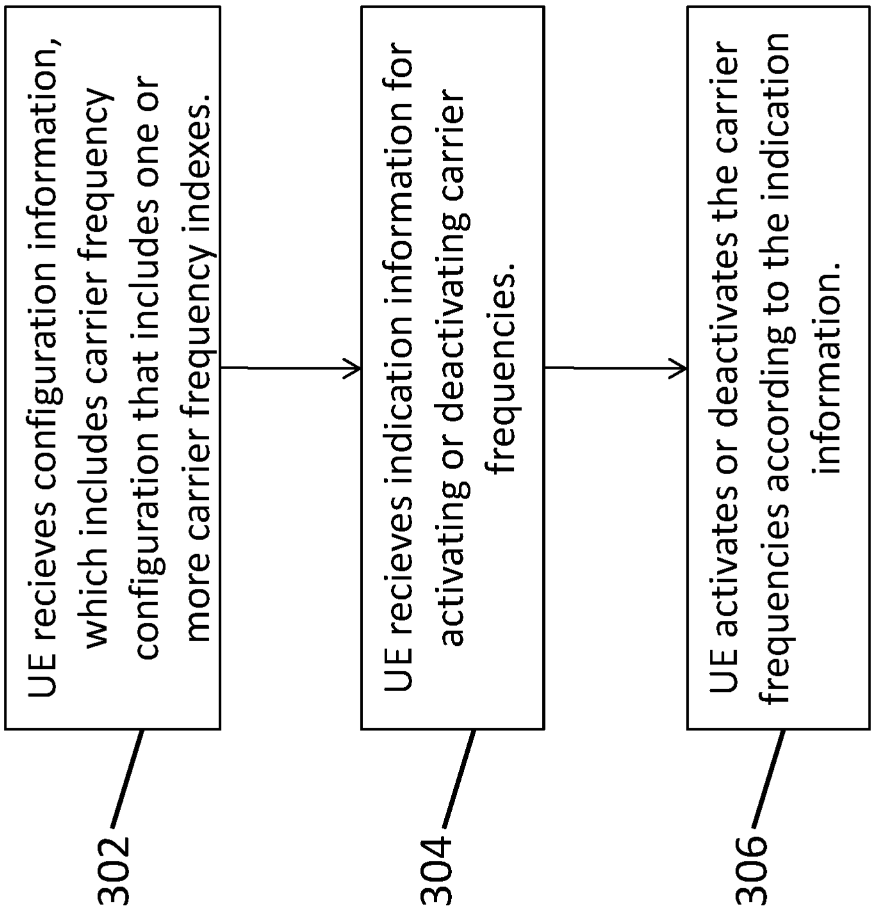
FIG. 3 shows another example of a flowchart of a UE-side processing of the method.

FIG. 3 is a flowchart of UE side processing of the method of the present invention in this embodiment, where the steps include:

Step 1 (302):

UE receives configuration information, which includes a carrier frequency configuration that includes one or more carrier frequency indexes.

UE receives configuration of carrier frequencies but does not directly use these carrier frequencies. UE will only use the activated carrier frequencies.

The carrier frequency index included in the carrier frequency configuration is used for activation/deactivation process.

carrier frequency configuration is configured through RRC messages. The RRC messages include RRCsetup, RRCReconfiguration, ReconfigurationWithSync, or system messages. The system message includes: SIB1.

Furthermore, system message received by UE in the IDLE state or the INACTIVE state includes the configuration, and RRCsetup and/or RRCReconfiguration received by UE in the connected state includes the configuration. During the handover process, the ReconfigurationWithSync received by UE includes the configuration.

The configuration is modified through high-layer signaling, and the high-layer signaling includes RRCReconfiguration.

Step 2 (304):

UE receives the indication information for activating or deactivating carrier frequencies.

The indication information for activating carrier frequencies indicates the carrier frequencies that needs to be activated. The indication information used to deactivate carrier frequencies indicates the carrier frequencies that needs to be deactivated. UE is configured with multiple carrier frequencies, but not all configured carrier frequencies are used. UE may only use some carrier frequencies in a given time, and these carrier frequencies are a subset of the configured carrier frequencies. UE determines the carrier frequencies to be activated according to the carrier frequencies indicated in the activation indication information. UE determines the carrier frequencies that needs to be deactivated according to the carrier frequencies indicated in the deactivation indication information and the carrier frequencies that still need to be in the activated state.

When a carrier frequency needs to be activated, the all correspondences between carriers and the carrier frequency also need to be activated at the same time. Further, UE also needs to determine whether the corresponding carriers in the correspondences have been activated. When one of the corresponding carriers has been activated, the correspondence between the carrier and the carrier frequency also needs to be activated, otherwise the correspondence between the carrier and the carrier frequency cannot be activated. When the corresponding carriers all have been activated, the all correspondences between the corresponding carriers and the carrier frequency also needs to be activated, otherwise only the correspondences between the activated carriers and the carrier frequency cannot be activated. When a carrier frequency needs to be deactivated, the all correspondences between carriers and the carrier frequency also needs to be deactivated at the same time.

Indication information used to activate or deactivate the carrier frequency includes: L3 indication information, L2 indication information, and L1 indication information. L3 indication information includes: RRC message and RRC IE. L2 indication information includes MACCE. L1 indication information includes DCI. RRC messages include: RRCsetup, RRCReconfiguration, ReconfigurationWithSync, system messages. System messages include SIB1.

The methods for RRC IE to indicate the activation or deactivation of the carrier frequency include: Method 1:

The radio resource control information element (RRC IE) indicates the information of the activated carrier frequency, including list of activated carrier frequency indexes and list of deactivated carrier frequency indexes.

Furthermore,

```
The configuration of the activation or deactivation of the carrier frequency:: = SEQUENCE {
List of activated carrier frequency indexes SEQUENCE (SIZE (1..max number of carrier
frequency)) OF carrier frequency index;
```

-continued

```
List of deactivated carrier frequency indexes SEQUENCE (SIZE (1..max number of carrier
frequency)) OF carrier frequency index;
}
```

The carrier frequencies corresponding to the carrier frequency indexes in the list of activated carrier frequency indexes is the activated carrier frequency.

The carrier frequencies corresponding to the carrier frequency indexes in the list of deactivated carrier frequency indexes is the deactivated carrier frequency.

Method 2

The radio resource control information element (RRC IE) indicates the activated or deactivated carrier frequency information, including: an add list of carrier frequency indexes in the active state and a delete list of carrier frequency indexes in the active state.

Furthermore,

```
The activation or deactivation configuration of carrier frequency:: = SEQUENCE {
The add list of carrier frequency index in the active state (ToAddModList) SEQUENCE (SIZE
(1..max number of carrier frequency)) OF carrier frequency index;
The delete list of carrier frequency index in the active state (ToReleaseList) SEQUENCE (SIZE
(1..max number of carrier frequency)) OF carrier frequency index;
}
```

The carrier frequency corresponding to the carrier frequency index in the added list is the activated carrier frequency.

The carrier frequency corresponding to the carrier frequency index in the delete list is the deactivated carrier frequency.

Indication information for activating the carrier frequency includes: RRC message, and the RRC message includes RRCsetup, RRCReconfiguration, ReconfigurationWithSync, or system message. System message includes: SIB1.

Furthermore, system message received by UE in the IDLE state or the INACTIVE state includes the indication information. RRCsetup and/or RRCReconfiguration received by UE in the connected state includes the indication information. During the handover process, the ReconfigurationWithSync received by UE includes the indication information.

The indication information is modified through high-layer signaling, and the high-layer signaling includes: RRCReconfiguration.

The indication information used to deactivate the carrier frequency includes: RRC message. RRC message includes RRCReconfiguration, ReconfigurationWithSync, or system message. System message includes SIB1.

Furthermore, RRCsetup and/or RRCReconfiguration received by UE in the connected state include the indication information. During the handover process, the ReconfigurationWithSync received by UE includes the indication information.

The indication information is modified through high-layer signaling, and the high-layer signaling includes: RRCReconfiguration.

The ways in which MACCE indicates to activate and deactivate carrier frequencies include:

Method 1

MACCE contains N same type fields, each field corresponds to a carrier frequency, and the value of this field indicates the activation/deactivation status of the carrier frequency. The field number is determined according to the carrier frequency index, the first field corresponds to the smallest index, the second field corresponds to the second smallest index, and so on. N corresponds to the maximum number of carrier frequencies that need to be activated or deactivated. N is configurable. N can equal the number of configured carrier frequencies.

For example, a field value of 1 indicates that the corresponding carrier frequency is activated; a field value of 0 indicates that the corresponding carrier frequency is deactivated.

Method 2

MACCE contains a first type field indicating whether the MACCE is used for activation or deactivation; N second type fields, each field corresponding to a carrier frequency, and the value of this field indicates activation status of the carrier frequency or deactivation status of the carrier frequency. The field number is determined according to the carrier frequency index, the first field corresponds to the smallest index, the second field corresponds to the second smallest index, and so on. N corresponds to the maximum number of carrier frequencies that need to be activated or deactivated. N is configurable. N can equal the number of configured carrier frequencies.

For example, when the first type field indicates that the MACCE is used for activation, the value of the second type field is 1 indicating that the corresponding carrier frequency is activated, and the value of the second type field is 0 indicating that the corresponding carrier frequency is not activated. The first type field indicates that the MACCE is used for deactivation, the value of the second type field is 1 indicating that the corresponding carrier frequency is deactivated, and the value of the second type field is 0 indicating that the corresponding carrier frequency is not deactivated.

The methods for DCI to indicate activation and deactivation of carrier frequencies include: the DCI contains N bits, with each bit corresponding to a carrier frequency. The value of these bits indicate the activation/deactivation status of corresponding carrier frequencies. A value of 1 indicates activation, and a value of 0 indicates deactivation. The bit order is determined according to the carrier frequency index, the first field corresponds to the smallest index, the second field corresponds to the second smallest index, and so on. N corresponds to the maximum number of carrier frequencies that need to be activated or deactivated. N is configurable. N can be equal to the number of configured carrier frequencies.

Step 3 (306):

UE activates or deactivates the carrier frequencies according to the indication information.

UE determines the one or more carrier frequencies that need to be activated or deactivated through the indication information and activates or deactivates the corresponding carrier frequencies. UE uses the activated carrier frequencies. When a carrier frequency is activated, all correspondences between carriers and the carrier frequency are also activated at the same time. Further, UE also needs to determine whether the corresponding carriers in the correspondences have been activated. When the carriers has been activated, the correspondences between the carriers and the carrier frequency are activated; otherwise, the correspondences between the not activated carriers and the carrier frequency are not activated. When a carrier frequency is deactivated, all correspondences between carriers and the carrier frequency are also deactivated at the same time.

Before acquiring new indication information, UE always executes the content indicated by the latest indication information.

When the carrier configuration, or carrier frequency configuration, or the configuration of the correspondences between carriers and carrier frequencies is reconfigured, UE releases the activated carrier frequencies and the activated correspondences between carriers and carrier frequencies.

Embodiment 3 (Carrier Activation or Deactivation)

To better manage the energy consumption of terminal, carriers can be activated or deactivated, and UE uses the activated carrier, so that energy consumption of UE can be well controlled.

Figure 4:
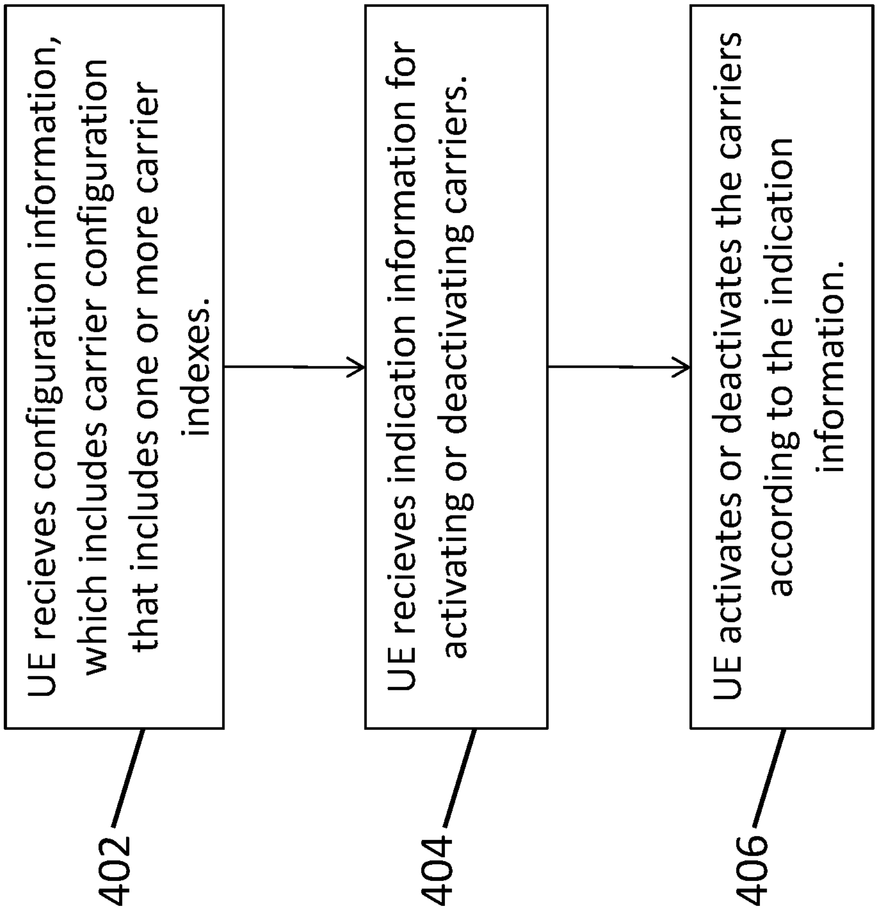
FIG. 4 shows another example of a flowchart of a UE-side processing of the method.

FIG. 4 is a flowchart of UE side processing of the method of the present invention in this embodiment, where the steps include: Step 1 (402):

UE receives configuration information, and the configuration information includes a carrier configuration that includes one or more carrier indexes.

UE receives configured carriers but does not directly use these carriers. UE will only use the activated carriers.

Carrier index included in the carrier configuration is used for activation or deactivation process.

Carrier index is configured through RRC messages. RRC messages include RRCsetup, RRCReconfiguration, ReconfigurationWithSync, or system messages. System message includes SIB1.

Further, system message received by UE in the IDLE state or the INACTIVE state includes the configuration, and RRCsetup and/or RRCReconfiguration received by UE in the connected state includes the configuration. During the handover process, ReconfigurationWithSync received by UE includes the configuration.

The configuration is modified through high-layer signaling, and high-layer signaling includes RRCReconfiguration.

Step 2 (404):

UE receives indication information for activating or deactivating one or more carriers.

The indication information for activating the carriers indicates the carriers that need to be activated. The indication information used to deactivate carriers indicates the carriers that need to be deactivated. UE is configured with multiple carriers, but not all configured carriers are used by UE. UE may only use a part of the carriers in a given time, and these carriers are a subset of the configured carriers. UE determines which carriers to be activated according to indication information. UE determines which carriers to be deactivated and which carriers that still needs to be in the activated state according to indication information.

When a carrier needs to be activated, all correspondences between the carrier and carrier frequencies also need to be activated at the same time. Further, UE also needs to determine whether the corresponding carrier frequencies in the correspondences have been activated. When the carrier frequencies have been activated, the correspondences between the carrier and the carrier frequencies also needs to be activated, otherwise the correspondences between the carrier and the not activated carrier frequencies cannot be activated. When a carrier is deactivated, all correspondences between the carrier and carrier frequencies are also deactivated at the same time.

The indication information used to activate or deactivate carriers includes: L3 indication information, L2 indication information, and L1 indication information. L3 indication information includes RRC message and RRC IE. L2 indication information includes MACCE. L1 indication information includes DCI. RRC messages include: RRCsetup, RRCReconfiguration, ReconfigurationWithSync, or system message. System messages include SIB1.

The methods for RRC IE to indicate the activation or deactivation of the carrier include:

Method 1

The radio resource control information element (RRC IE) indicates activated carriers, including list of activated carrier indexes and list of deactivated carrier indexes.

Furthermore,

```
The configuration of the activation or deactivation of carrier:: = SEQUENCE {
List of activated carrier indexes SEQUENCE (SIZE (1..max number of carrier)) OF carrier
index;
List of deactivated carrier indexes SEQUENCE (SIZE (1..max number of carrier)) OF carrier
index;
}
```

The carriers corresponding to the carrier indexes in the activated list are the activated carriers.

The carriers corresponding to the carrier indexes in the deactivated list are the deactivated carriers.

Method 2

The radio resource control information element (RRC IE) indicates the activated or deactivated carrier information, including: an add list of activated carrier indexes; a delete list of activated carrier indexes.

Furthermore,

```
The configuration of the activation or deactivation of carrier:: = SEQUENCE {
Add list (ToAddModList) of activated carrier index SEQUENCE (SIZE (1..max number of
carrier)) OF carrier index;
Release list (ToReleaseList) of activated carrier index SEQUENCE (SIZE (1..max number of
carrier)) OF carrier index;
}
```

The carriers corresponding to the carrier indexes in the add list are activated carriers.

The carriers corresponding to the carrier indexes in the release list are deactivated carriers.

The indication information for activating or deactivating the carrier includes: RRC message. RRC message includes RRCsetup, RRCReconfiguration, ReconfigurationWithSync, or system message. System message includes: SIB1.

Furthermore, system message received by UE in the IDLE state or the INACTIVE state includes the indication information, and RRCsetup and/or RRCReconfiguration received by UE in the connected state includes the indication information. During the handover process, ReconfigurationWithSync received by UE includes the indication information.

The indication information is modified through high-layer signaling, and high-layer signaling includes: RRCReconfiguration.

The MACCE used to activate and/or deactivate carriers corresponds to an LCID, and the LCID indicates that the MACCE is used to activate and/or deactivate carriers.

The ways that MACCE indicates to activate and/or deactivate carriers include:

Method 1

The MACCE contains N same type fields, each field corresponding to a carrier, and the value of this field indicates the activation/deactivation status of the corresponding carrier. The field number is determined according to carrier index, the first field corresponds to the smallest index, the second field corresponds to the second smallest index, and so on. Where, N corresponds to the number of carriers that need to be activated or deactivated at most, and N is configurable. N can be equal to the number of configured carriers.

For example, a field value of 1 indicates that the corresponding carrier is activated; a field value of 0 indicates that the corresponding carrier is deactivated.

Method 2

MACCE contains: a first type field indicating whether the MACCE is used for activation or deactivation; N second type fields, each field corresponding to a carrier, and the value of this field indicates activation status of the carrier or activation status of the carrier. The field number is determined according to the carrier index, the first field corresponds to the smallest index, the second field corresponds to the second smallest index, and so on. Where, N corresponds to the number of carriers that need to be activated or deactivated at most. N is configurable. N can be equal to the number of configured carriers.

For example, if the first type field indicates that the MACCE is used for activation, the value of the second type field is 1 indicating that the corresponding carrier is activated, and the value of the second type field is 0 indicating that the corresponding carrier is not activated; If the first type field indicates that the MACCE is used for deactivation, a value of 1 in the second type field indicates that the corresponding carrier is deactivated, and a value of 0 in the second type field indicates that the corresponding carrier is not deactivated.

DCI may be used to activate and deactivate carriers includes: the DCI contains N bits, and each bit corresponds to a carrier. The value of this bit indicates the corresponding carrier to be activated or deactivated. A value of 1 indicates activation, and a value of 0 indicates deactivation. The bit order is determined by the carrier index, the first field corresponds to the smallest index, the second field corresponds to the second smallest index, and so on. Where, N corresponds to the number of carriers that need to be activated or deactivated at most. N is configurable. N can be equal to the number of configured carriers.

Step 3 (406):

UE activates or deactivates the carriers according to the indication information.

UE determines the carriers that need to be activated or deactivated through the indication information and activates or deactivates the corresponding carriers. UE uses the activated carriers. When a carrier is activated, all correspondences between the carrier and carrier frequencies are also activated at the same time. Further, UE also needs to determine whether the corresponding carrier frequencies in the correspondences have been activated. When the carrier frequencies have been activated, the correspondences between the carrier and the carrier frequencies are activated; otherwise, the correspondences between the carrier and the not activated carrier frequencies are not activated. When a carrier is deactivated, all correspondences between the carrier and carrier frequencies are also deactivated at the same time.

Before acquiring new indication information, UE always executes the content indicated by the latest indication information.

When the carrier configuration, or carrier frequency configuration, or the configuration of the correspondences between carriers and carrier frequencies is reconfigured, UE releases the activated carrier and the activated correspondences between carriers and carrier frequencies.

Some preferred embodiments may incorporate the following technical solutions.

Figure 7A:
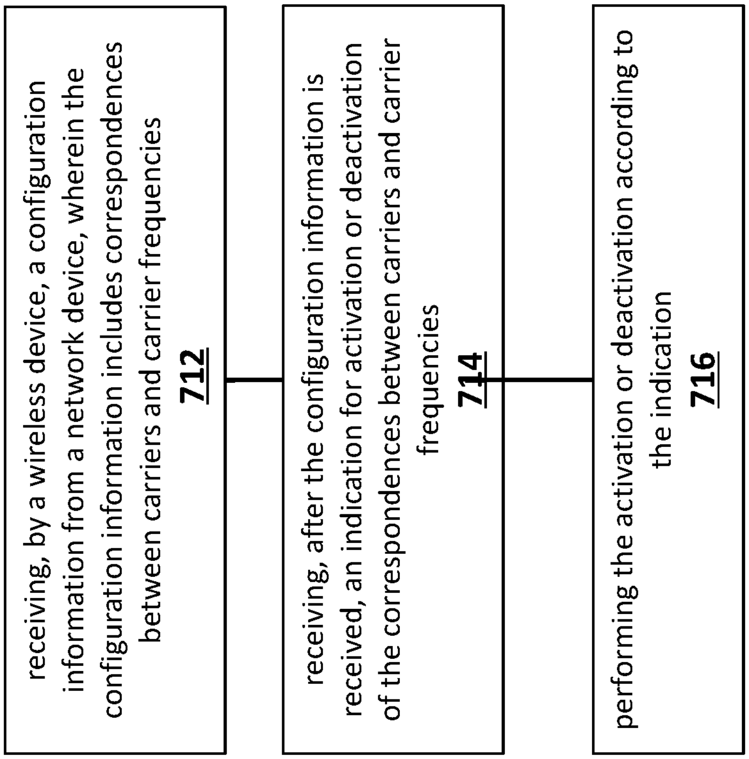
FIGS. 7A-7F show flowcharts for example methods of wireless communication.

1. A method of wireless communication (e.g., method 710 depicted in FIG. 7A), comprising: receiving (712), by a wireless device, a configuration information from a network device, wherein the configuration information includes correspondences between carriers and carrier frequencies; receiving (714), after the configuration information is received, an indication for activation or deactivation of the correspondences between carriers and carrier frequencies; and performing (716) the activation or deactivation according to the indication. Here, in case that the indication is for activation, then activation is performed in 716 and in case that the indication is for deactivation, then deactivation is performed in 716.

2. The method of solution 1, wherein the performing the activation or deactivation includes activating a correspondence between carriers and carrier frequencies upon detecting that the carriers and the carrier frequencies are all activated. If not all the carriers and the carrier frequencies are activated, then activation may not be performed.

Figure 7B:
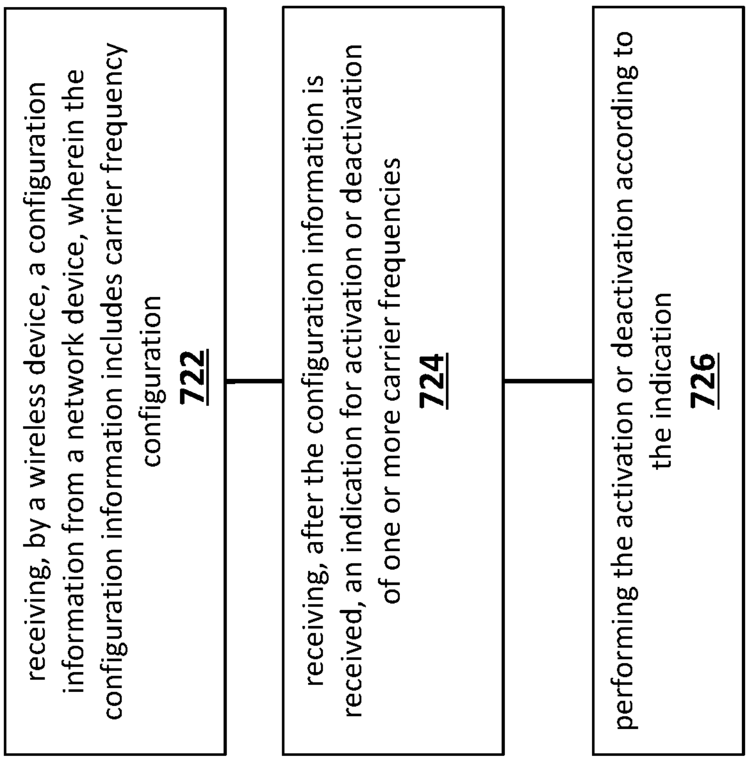

3. A method of wireless communication (e.g., method 720 depicted in FIG. 7B), comprising: receiving (722), by a wireless device, a configuration information from a network device, wherein the configuration information includes carrier frequency configuration; receiving (724), after the configuration information is received, an indication for activation or deactivation of one or more carrier frequencies; and performing (726) the activation or deactivation according to the indication. At 726, in case that the indication is for activation, then activation is performed and in case that the indication is for deactivation, then deactivation is performed.

4. The method of solution 3, further including, according to the indication for activation or deactivation of one or more carrier frequencies, activating or deactivating all the correspondences between carriers and carrier frequencies, which are associated with the one or more carrier frequencies. Here, activating all the correspondences is performed in case that the indication is for activation. In case that the indication is for deactivation, then all the correspondences are deactivated.

5. The method of solution 4, wherein the performing the activation or deactivation includes activating correspondences between carriers and carrier frequencies associated with the carrier frequencies upon detecting that the carriers associated with the correspondences are all activated. In case that some of the carriers associated with the correspondences are not activated, then the correspondences between the not activated carriers and carrier frequencies are not activated.

Figure 7C:
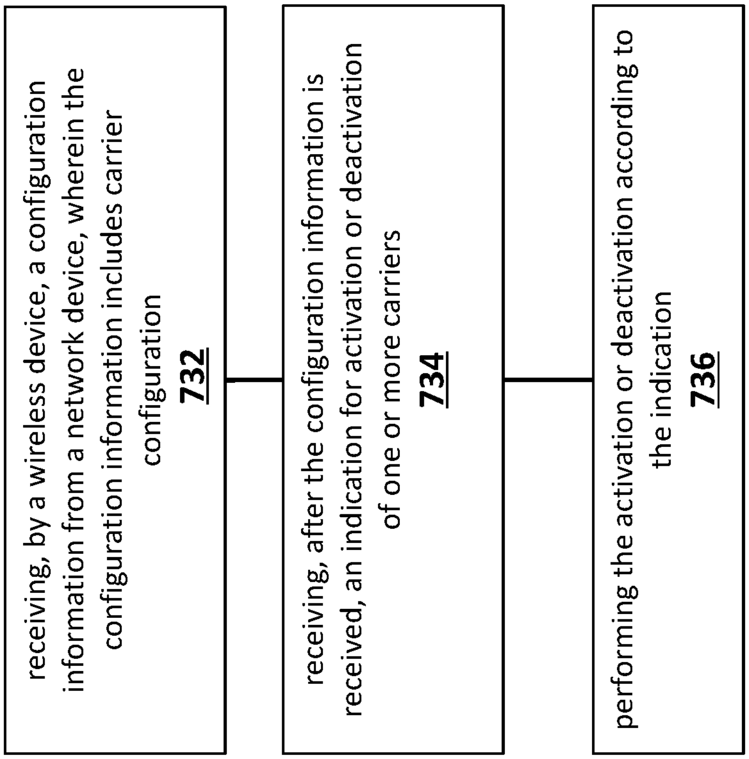

6. A method of wireless communication (e.g., method 730 depicted in FIG. 7C), comprising: receiving (732), by a wireless device, a configuration information from a network device, wherein the configuration information includes carrier configuration; receiving (734), after the configuration information is received, an indication for activation or deactivation of one or more carriers; and performing (736) the activation or deactivation according to the indication. At 736, in case that the indication is for activation, then activation is performed and in case that the indication is for deactivation, then deactivation is performed.

7. The method of solution 6, further including, according to the indication for activation or deactivation of the one or more carriers, activating or deactivating all correspondences between carriers and carrier frequencies, which are associated with the one or more carriers.

8. The method of solution 7, wherein the performing the activation or deactivation includes activating correspondences between carriers and carrier frequencies associated with the carriers upon detecting that the carrier frequencies associated with the correspondences are all activated.

Additional details of the above-described solutions 1, 3 and 6 are provided with references to FIGS. 2, 3, and 4 and corresponding description, respectively.

Figure 7D:
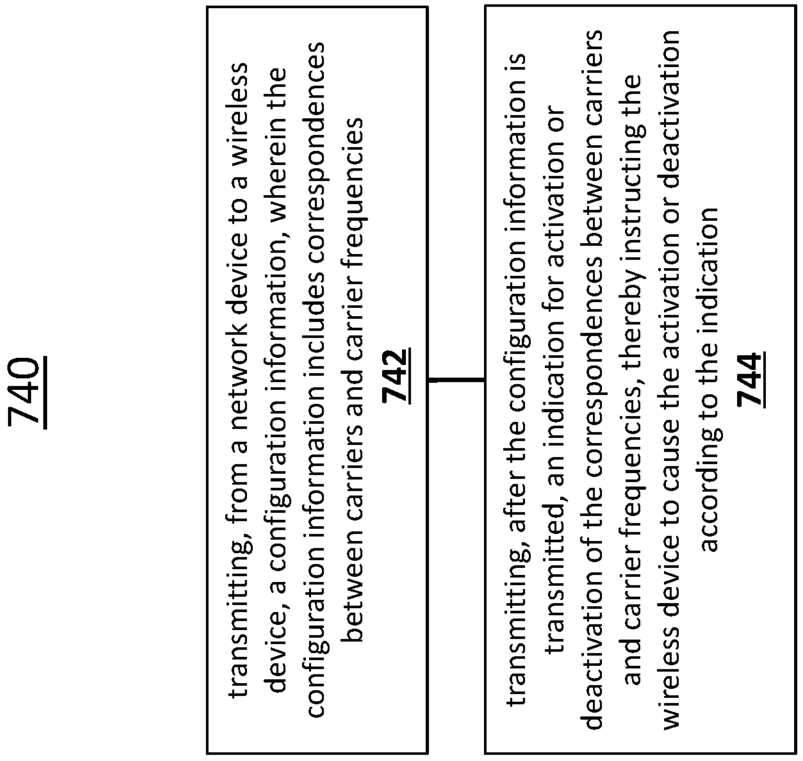

9. A method of wireless communication (e.g., method 740 depicted in FIG. 7D), comprising: transmitting (742), from a network device to a wireless device, a configuration information, wherein the configuration information includes correspondences between carriers and carrier frequencies; transmitting (744), after the configuration information is transmitted, an indication for activation or deactivation of the correspondences between carriers and carrier frequencies, thereby instructing the wireless device to cause the activation or deactivation according to the indication. At 744, in case that the indication is for activation, then activation is performed and in case that the indication is for deactivation, then deactivation is performed.

10. The method of solution 9, wherein the activation or deactivation includes activating a correspondence between carriers and carrier frequencies upon detecting that the carriers and the carrier frequencies are all activated.

Figure 7E:
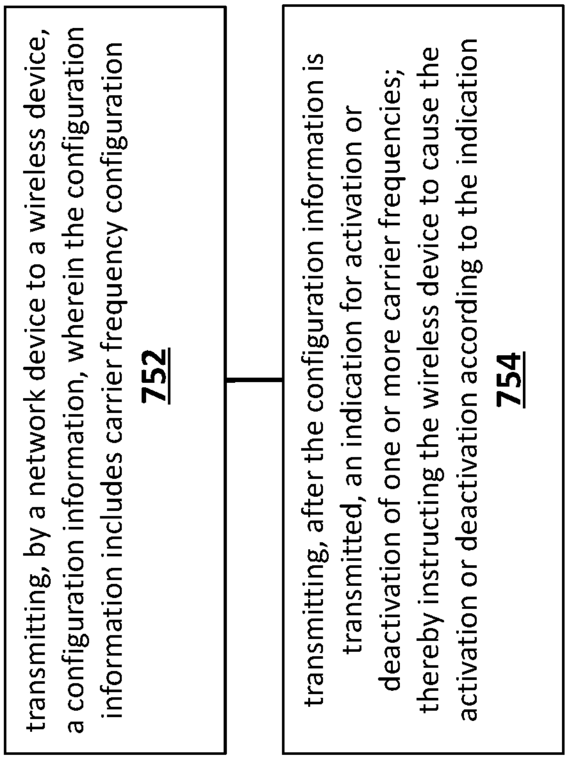

11. A method of wireless communication (e.g., method 750 depicted in FIG. 7E), comprising: transmitting (752), by a network device to a wireless device, a configuration information, wherein the configuration information includes carrier frequency configuration; transmitting (754), after the configuration information is transmitted, an indication for activation or deactivation of one or more carrier frequencies; thereby instructing the wireless device to cause the activation or deactivation according to the indication. At 754, in case that the indication is for activation, then activation is performed and in case that the indication is for deactivation, then deactivation is performed.

12. The method of solution 11, wherein the indication for activation or deactivation of one or more carrier frequencies, causes an activation or deactivation of all the correspondences between carriers and carrier frequencies, which are associated with the one or more carrier frequencies.

13. The method of solution 12, wherein the activation or deactivation includes activating correspondences between carriers and carrier frequencies, associated with the carrier frequencies upon detecting that the carriers associated with the correspondences are all activated.

Figure 7F:
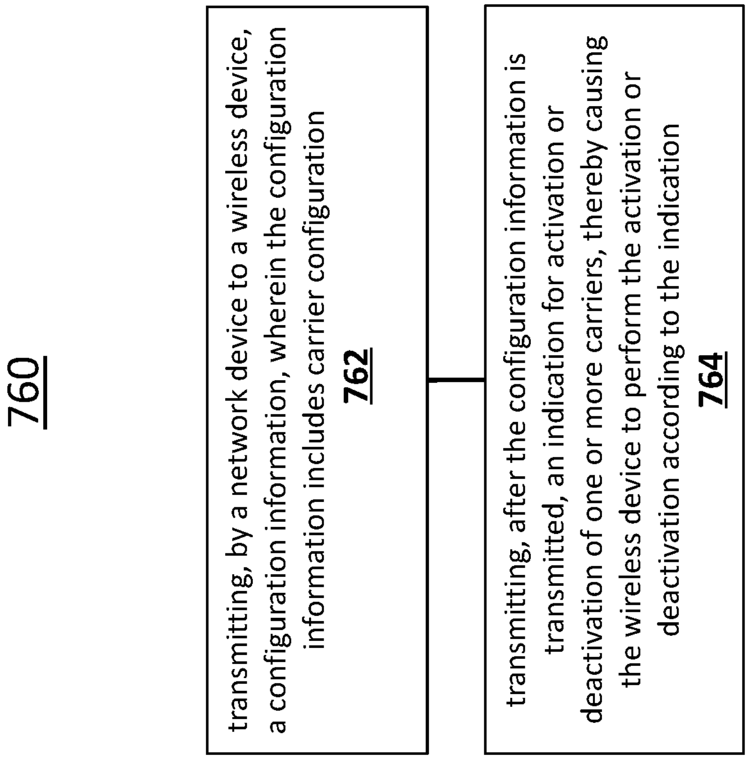

14. A method of wireless communication (e.g., method 760 depicted in FIG. 7F), comprising: transmitting (762), by a network device to a wireless device, a configuration information, wherein the configuration information includes carrier configuration; transmitting (764), after the configuration information is transmitted, an indication for activation or deactivation of one or more carriers, thereby causing the wireless device to perform the activation or deactivation according to the indication. At 764, in case that the indication is for activation, then activation is performed and in case that the indication is for deactivation, then deactivation is performed.

15. The method of solution 14, wherein the indication for activation or deactivation of the one or more carriers, causes an activation or deactivation of all correspondences between carriers and carrier frequencies, which are associated with the one or more carriers.

16. The method of solution 15, wherein the activation or deactivation includes activating correspondences between carriers and carrier frequencies, associated with the carriers upon detecting that the carrier frequencies associated with the correspondences are all activated.

Additional details of the above described solutions 9, 11 and 14 are provided with references to FIGS. 2, 3, and 4 and corresponding description, respectively.

17. An apparatus for wireless communication (e. g., as depicted in FIG. 6) comprising a processor configured to implement the method of any of above solutions.

18. A computer readable medium having code stored thereon, the code when executed by a processor, causing the processor to implement a method recited in any of above solutions.

Figure 5:
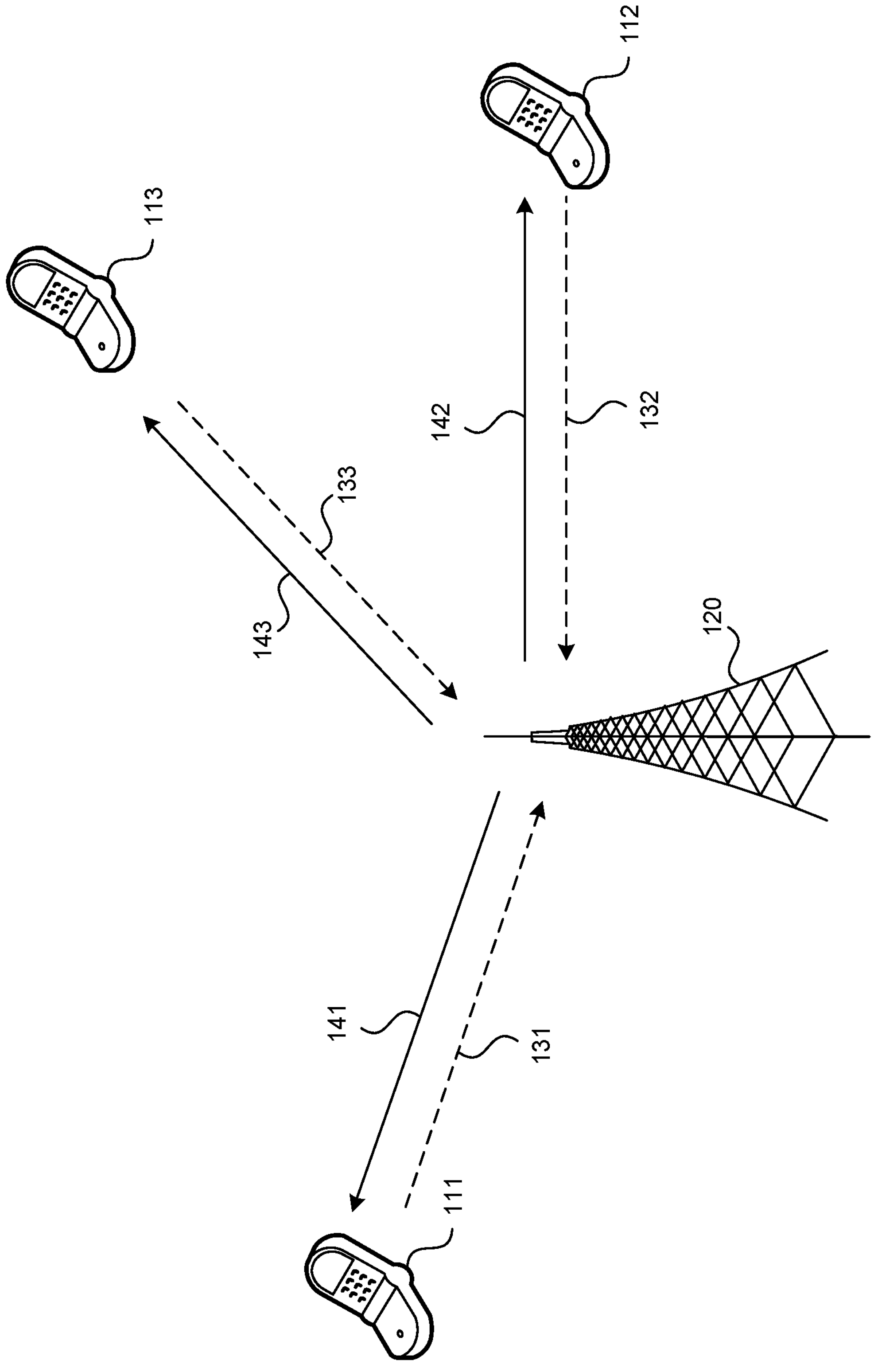
FIG. 5 depicts an example of a wireless network.

FIG. 5 shows an example of a wireless communication system (e.g., a long term evolution (LTE), 5G or NR cellular network, or next generation networks beyond 5G, such as 6th generation networks) that includes a base station (BS) 120 and one or more user equipment (UE) 111, 112 and 113. The base station, which is a network device, may be implemented on land (e.g., a cell tower) or in the air (e.g., a satellite or an aerial vehicle). In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. UE may be, for example, a smartphone, a tablet, a mobile computer, a machine to machine (M2M) device, a terminal, a mobile device, an Internet of Things (IoT) device, and so on.

Figure 6:
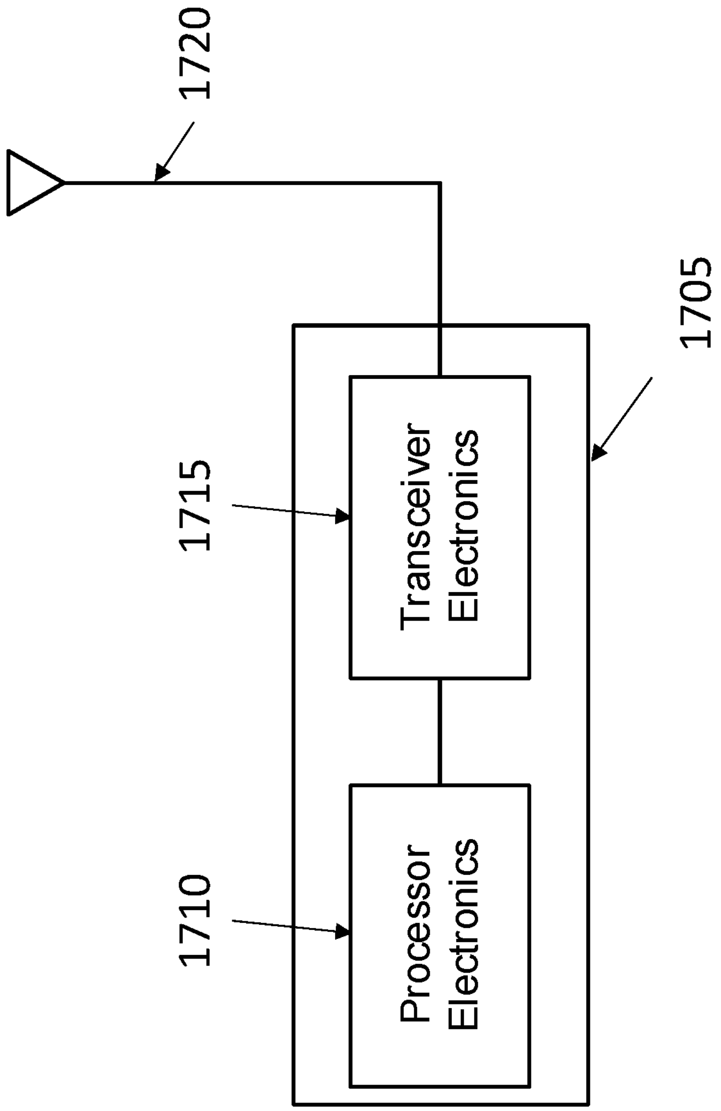
FIG. 6 is a block diagram of an example apparatus for wireless communication.

FIG. 6 is a block diagram representation of a portion of an apparatus, in accordance with some embodiments of the presently disclosed technology. An apparatus 1705 such as a network device or a base station or a wireless device (or UE), can include processor electronics 1710 such as a microprocessor that implements one or more of the techniques presented in this document. The apparatus 1705 can include transceiver electronics 1715 to send and/or receive wireless signals over one or more communication interfaces such as antenna(s) 1720. The apparatus 1705 can include other communication interfaces for transmitting and receiving data. Apparatus 1705 can include one or more memories (not explicitly shown) configured to store information such as data and/or instructions. In some implementations, the processor electronics 1710 can include at least a portion of the transceiver electronics 1715. In some embodiments, at least some of the disclosed techniques, modules or functions are implemented using the apparatus 1705.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

The invention claimed is:

1. A method of wireless communication, comprising:

receiving, by a wireless device, a configuration information from a network device, wherein the configuration information includes correspondences between carriers and carrier frequencies;

receiving, after the configuration information is received, an indication for activation or deactivation of the correspondences between carriers and carrier frequencies, wherein the indication comprises log2(M) bits indicating a carrier index and N bits each corresponding to a carrier frequency, wherein M is a number of configured carriers and N is a number of the correspondences between the carriers and the carrier frequencies configured in the configuration information; and performing the activation or deactivation according to the indication.

2. The method of claim 1, wherein the performing the activation or deactivation includes activating a correspondence between carriers and carrier frequencies upon detecting that the carriers and the carrier frequencies are all activated.

3. The method of claim 1, wherein the configuration information includes a carrier frequency configuration or a carrier configuration, the method further comprising:

according to an indication for activation or deactivation of one or more carrier frequencies, activating or deactivating all the correspondences between carriers and carrier frequencies, which are associated with the one or more carrier frequencies; or according to an indication for activation or deactivation of one or more carriers, activating or deactivating all the correspondences between carriers and carrier frequencies, which are associated with the one or more carriers.

4. The method of claim 3, wherein the performing the activation or deactivation includes activating the correspondences between the carriers and carrier frequencies associated with the one or more carrier frequencies upon detecting that the carriers associated with the correspondences are all activated.

5. The method of claim 3, wherein the performing the activation or deactivation includes activating the correspondences between carriers and carrier frequencies associated with the one or more carriers upon detecting that the carrier frequencies associated with the correspondences are all activated.

6. A method of wireless communication, comprising:

transmitting, from a network device to a wireless device, a configuration information, wherein the configuration information includes correspondences between carriers and carrier frequencies;

transmitting, after the configuration information is transmitted, an indication for activation or deactivation of the correspondences between carriers and carrier frequencies, wherein the indication comprises log2(M) bits indicating a carrier index and N bits each corresponding to a carrier frequency, wherein M is a number of configured carriers and N is a number of the correspondences between the carriers and the carrier frequencies configured in the configuration information, thereby instructing the wireless device to cause the activation or deactivation according to the indication.

7. The method of claim 6, wherein the activation or deactivation includes activating a correspondence between carriers and carrier frequencies upon detecting that the carriers and the carrier frequencies are all activated.

8. The method of claim 6, wherein the configuration information includes a carrier frequency configuration or a carrier configuration, wherein an indication for activation or deactivation of one or more carrier frequencies causes an activation or deactivation of all the correspondences between carriers and carrier frequencies, which are associated with the one or more carrier frequencies; or wherein an indication for activation or deactivation of one or more carriers causes an activation or deactivation of all the correspondences between carriers and carrier frequencies, which are associated with the one or more carriers.

9. The method of claim 8, wherein the activation or deactivation of the correspondences between carriers and carrier frequencies includes activating the correspondences between the carriers and carrier frequencies associated with the one or more carrier frequencies upon detecting that the carriers associated with the correspondences are all activated.

10. The method of claim 8, wherein the activation or deactivation of the correspondences between carriers and carrier frequencies includes activating the correspondences between the carriers and carrier frequencies associated with the one or more carriers upon detecting that the carrier frequencies associated with the correspondences are all activated.

11. An apparatus of wireless communication comprising a processor and a memory storing instructions, execution of which by the processor causes the apparatus to:

receive a configuration information from a network device, wherein the configuration information includes correspondences between carriers and carrier frequencies;

receive, after the configuration information is received, an indication for activation or deactivation of the correspondences between carriers and carrier frequencies, wherein the indication comprises log2(M) bits indicating a carrier index and N bits each corresponding to a carrier frequency, wherein M is a number of configured carriers and N is a number of the correspondences between the carriers and the carrier frequencies configured in the configuration information; and perform the activation or deactivation according to the indication.

12. The apparatus of claim 11, wherein performing the activation or deactivation includes activating a correspondence between carriers and carrier frequencies upon detecting that the carriers and the carrier frequencies are all activated.

13. The apparatus of claim 11, wherein the configuration information includes a carrier frequency configuration or a carrier configuration, the apparatus further caused to:

according to an indication for activation or deactivation of one or more carrier frequencies, activate or deactivate all the correspondences between carriers and carrier frequencies, which are associated with the one or more carrier frequencies; or according to an indication for activation or deactivation of one or more carriers, activate or deactivate all the correspondences between carriers and carrier frequencies, which are associated with the one or more carriers.

14. The apparatus of claim 13, wherein performing the activation or deactivation includes activating the correspondences between the carriers and carrier frequencies associated with the one or more carrier frequencies upon detecting that the carriers associated with the correspondences are all activated.

15. The apparatus of claim 13, wherein performing the activation or deactivation includes activating the correspondences between carriers and carrier frequencies associated with the one or more carriers upon detecting that the carrier frequencies associated with the correspondences are all activated.

16. An apparatus of wireless communication comprising a processor and a memory storing instructions, execution of which by the processor causes the apparatus to:

transmit, to a wireless device, a configuration information, wherein the configuration information includes correspondences between carriers and carrier frequencies;

transmit, after the configuration information is transmitted, an indication for activation or deactivation of the correspondences between carriers and carrier frequencies, wherein the indication comprises log2(M) bits indicating a carrier index and N bits each corresponding to a carrier frequency, wherein M is a number of configured carriers and N is a number of the correspondences between the carriers and the carrier frequencies configured in the configuration information, thereby instructing the wireless device to cause the activation or deactivation according to the indication.

17. The apparatus of claim 16, wherein the activation or deactivation includes activating a correspondence between carriers and carrier frequencies upon detecting that the carriers and the carrier frequencies are all activated.

18. The apparatus of claim 16, wherein the configuration information includes a carrier frequency configuration or a carrier configuration, wherein an indication for activation or deactivation of one or more carrier frequencies causes an activation or deactivation of all the correspondences between carriers and carrier frequencies, which are associated with the one or more carrier frequencies; or wherein an indication for activation or deactivation of one or more carriers causes an activation or deactivation of all the correspondences between carriers and carrier frequencies, which are associated with the one or more carriers.

19. The apparatus of claim 18, wherein the activation or deactivation of the correspondences between carriers and carrier frequencies includes activating the correspondences between the carriers and carrier frequencies associated with the one or more carrier frequencies upon detecting that the carriers associated with the correspondences are all activated.

20. The apparatus of claim 18, wherein the activation or deactivation of the correspondences between carriers and carrier frequencies includes activating the correspondences between the carriers and carrier frequencies associated with the one or more carriers upon detecting that the carrier frequencies associated with the correspondences are all activated.

* * * * *